Jan. 6, 1925. 1,522,190

O. JUNGGREN

ELASTIC FLUID TURBINE

Filed Dec. 8, 1923

Inventor:
Oscar Junggren,
by Alexander F. Lunt
His Attorney.

Patented Jan. 6, 1925.

1,522,190

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

ELASTIC-FLUID TURBINE.

Application filed December 8, 1923. Serial No. 679,481.

*To all whom it may concern:*

Be it known that I, OSCAR JUNGGREN, a citizen of the United States, residing at Schenectady, in the county of Schenectady, State of New York, have invented certain new and useful Improvements in Elastic-Fluid Turbines, of which the following is a specification.

In modern elastic fluid turbines of large size operating at high temperatures and pressures in order to prevent leakage at the points where the shaft passes through the shell or casing and also through the diaphragms, elaborate packing devices are required having clearances between the relatively rotating parts amounting to only a few thousandths of an inch. These packings usually have fine metal teeth which are easily damaged if for any reason the opposed parts rub when in service. The casings for these turbines must be made very strong and massive in order to resist the usual as well as the abnormal strains to which they are sometimes subjected, as for example, when the rotor gets badly out of balance due to the loss of buckets on one or more of the wheels. In addition to the mechanical stresses the casings are subjected to very great strains due to temperature changes. In order to prevent these strains from distorting the casing and causing the parts of the packings to rub it is necessary to so arrange the parts that the casing is free to expand and contract as a whole without, however, causing the axis of the casing to vary from coincidence with the axis of the rotor shaft.

The object of my invention is to improve the construction of turbines by providing a casing and support therefor of such character as to fulfill the requirements above specified.

For a consideration of what I believe to be novel and my invention, attention is directed to the accompanying description and the claims appended thereto.

Figure 1:
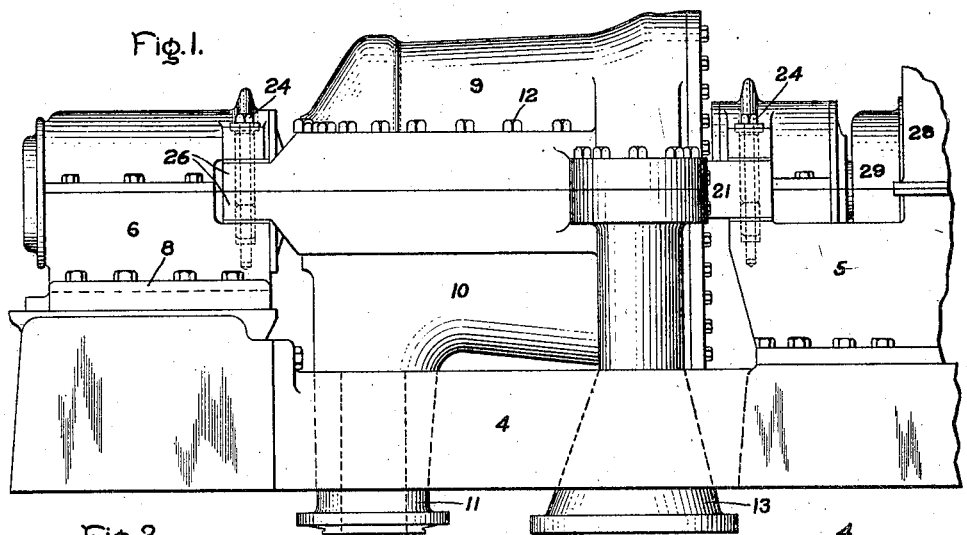
Figure 2:
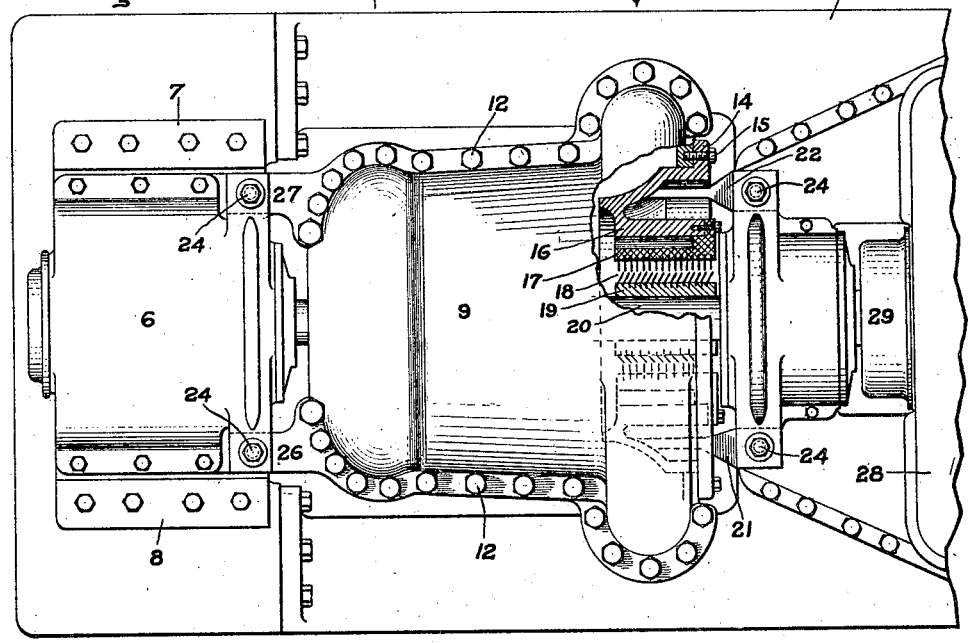
Figure 3:
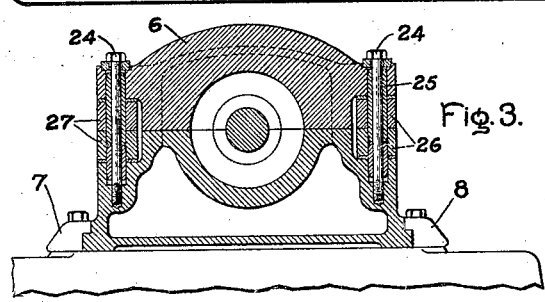

In the attached drawing which is illustrative of my invention Fig. 1 is a view in side elevation of a large high pressure steam turbine; Fig. 2 is a plan view of the same, and Fig. 3 is a detail sectional view of one of the bearing pedestals.

In order that some idea may be had of the size, weight, etc. of the turbine illustrated without, however, limiting myself thereto, the length of the casing between the bearings is approximately nine and one-half feet and its weight exclusive of rotor and other parts, is approximately twenty-seven thousand pounds. The turbine is designed to deliver 17,000 kw. at full load and operate with steam at from 550 to 600 lbs. pressure at 1800 R. P. M., the exhaust therefrom being delivered to a second unit operating at a lower pressure.

4 indicates the bed plate or foundation upon which the turbine is mounted and is made sufficiently strong to withstand the load to which it is subjected. 5 indicates the pedestal or pillow block for the shaft bearing at the exhaust end of the turbine. This is bolted rigidly to the bed plate and is therefor fixed in position. The pedestal 6 for the shaft bearing at the high pressure end is arranged to be movable in an axial direction to take care of expansions and contractions of the casing in an axial direction. To this end the pedestal is mounted between heavy parallel guides 7 and 8 which are bolted to the bed plate and also by reason of their overhanging tops hold the pedestal against vertical movements.

The casing proper is made of cast steel divided in a horizontal plane coinciding with that of the shaft into two principal parts 9 and 10. These are made as nearly symmetrical as possible. In order to admit steam to the casing a conduit 11 is provided, the axis of which is in a vertical plane in line with the shaft. The conduit extends downwardly from the lower half and its arrangement is such that any strains exerted by the steam supply pipe will be in line with the axis as distinguished from being at one side where the effects would be greater. The conduit is connected to the supply means by a U-shaped pipe (not shown) so as to reduce the piping strains as much as possible. The parts of the casing are united by a large number of heavy bolts 12 which pass through flanges along the meeting edges of the parts of the casing. Since the flanges on a casing when extended an appreciable distance beyond the casing proper give rise to unequal temperature strains in the casing, I purposely make them as narrow as possible thereby bringing the center line of the bolts as close to the bore of the casing as possible.

The exhaust hood is indicated at 13 and opens downwardly, being flared outwardly in both directions from the center. This arrangement affords sufficient cross-sectional area for the exhaust steam with a minimum axial length. Instead of dividing the whole exhaust end of the casing in the horizontal axial plane as is customary, a one piece cylindrical head 14 is provided which is secured to the exhaust end of the casing by a series of bolts 15.

In the exhaust head is an annular member 16 which carries the outer member 17 of a labyrinth packing, the latter having a large number of thin metal teeth 18 which are easily destroyed if rubbing takes place. The other packing member 19 is of a generally similar nature and is carried by the rotor shaft 20. The detail structure of the rotor is not illustrated since it is not material to the present invention. Any usual form may be employed. The particular type of packing forms no part of the present invention and for that reason is not illustrated in detail. A similar packing is also provided at the high pressure end as usual.

Secured to the exhaust head as by casting them integral therewith are two heavy and symmetrically arranged members or arms 21 and 22 located on opposite sides of the shaft. These members or arms enter slots or recesses in the pedestal 5, one on each side. The slots or recesses are arranged one-half in the lower or base portion of the pedestal and one-half in the removable cap therefor. Extending downwardly through the cap and arms into the base of the pedestal are heavy retaining bolts 24. Preferably these bolts are surrounded by sleeves 25 which make a snug fit in the holes and in this manner serve as dowel pins.

Referring now to the high pressure end of the casing, this is also provided with two heavy members or arms 26 and 27 which are formed as extensions of the bolting flanges. These members or arms are formed partly on the upper part of the casing and partly on the lower part so that their effect on the casing as a whole as regards temperature effects will be the same. These members are secured in the sliding pedestal or pillow block 6 in the manner described in connection with the arms at the exhaust end and as illustrated in Fig. 3. The members at opposite ends of the casing are preferably arranged at substantially the same radial distance from the axis thereof, so that the effects of temperature changes in the casing will affect them equally.

The turbine is arranged to drive the rotor of an electric generator 28, the stator of which is bolted to the bed plate. The shafts of the generator and turbine are connected by a coupling located inside of the shield or cover 29.

From the foregoing it will be seen that the casing is supported by four horizontal members or arms from the pedestals, two on each side; that the members at the exhaust end anchor the casing against longitudinal movement while the other members being secured to the sliding pedestal 6 move therewith as the casing expands axially. Although the members are massive they are, due to their length, capable of yielding or moving at their outer ends. As a result of this, a hinging action takes place about the anchoring bolts 24 and sleeves 25 on opposite sides of the shaft. This hinging action takes place whenever the casing expands and contracts in a radial direction. Since the mass of metal in each pair of members is the same both will move by the same amount for a given temperature change of the casing and this preserves the concentric arrangement of the casing, packings and shaft. As one pair of members is connected to a sliding pedestal while the other pair is attached to a fixed pedestal, it follows that the sliding pedestal will adjust itself in accordance with the total axial expansion of the casing, modified of course to the extent necessary to compensate for the bending or hinging of the members about their pivots due to radial expansions of the casing.

The members are made stiff enough to support the weight of the casing without measurable deflection and hence all parts thereof can freely expand and contract without disturbing the proper and concentric relation of the relatively moving parts. They also serve to prevent the casing from turning on its axis. One way to look at the matter is to consider the members as beams which are rigid in vertical planes but are capable of yielding a sufficient amount in a plane perpendicular thereto to compensate for variations in diameter of the casing due to its temperature changes.

In accordance with the provisions of the Patent Statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:—

1. In an elastic fluid turbine, the combination of a rotor and its shaft, a casing for the same, packing elements between the shaft and casing, members arranged in pairs for supporting the casing at its ends and which are movable in a direction perpendicular to the shaft as the diameter of the casing varies due to temperature changes, and supporting means for said members.

2. In an elastic fluid turbine, the combination of a rotor and its shaft, a casing for the same, packing elements between the shaft and casing, members arranged in pairs for supporting the casing at its ends and which are movable in a direction perpendicular to the shaft as the diameter of the casing varies due to temperature changes, a fixed support for the members at one end of the casing, and an axially sliding support for the members at the opposite end of the casing.

3. In an elastic fluid turbine, the combination of a rotor and its shaft, a casing for the same, packing elements between the shaft and casing, supporting members for the casing which are movable in a direction perpendicular to the axis thereof as the diameter of the casing varies due to temperature changes, a fixed support for the members at one end of the casing, a sliding support for the members at the opposite end of the casing, and pivotal connections between each of said members and its support.

4. In an elastic fluid turbine, the combination of a rotor and its shaft, a casing for the same, packing elements between the shaft and casing, supporting members arranged in pairs which are integral with the parts of the casing and project axially therefrom in the plane of the shaft, said members being rigid in a vertical plane and movable in a horizontal plane as the diameter of the casing varies with changes in temperature, a fixed support for the members at one end of the casing, a sliding support for the members at the opposite end of the casing, and means for connecting the members to said supports.

5. In an elastic fluid turbine, the combination of a rotor and its shaft, a casing for the same which comprises upper and lower elements and an annular head which is secured to said elements at one end, packing elements carried by the casing and shaft, a pair of supporting members which are secured to one end of the casing, a second pair of supporting members which are secured to the head, said members being capable of flexing in a plane perpendicular to the shaft, a fixed support to which one pair of members is secured, an axially-movable support to which the second pair of members is secured, and pivots for connecting the members to their supports.

6. In an elastic fluid turbine, the combination of a rotor and its shaft, bearings for the shaft, a casing for the same which comprises upper and lower flanged elements which are united along their meeting edges, packing elements carried by the casing and shaft, a pair of supporting members forming axial extensions of said flanges at one end of the casing, a second pair of members which project axially from the casing at the opposite end, pedestals for the shaft bearings each having recesses between the cap and base portions to receive the outer ends of said members, and pivots for the members which are located partly in said caps and partly in said base portions.

7. In an elastic fluid turbine, the combination of a rotor and its shaft, bearings for the shaft, a casing for the same which comprises upper and lower flanged elements which are united along their meeting edges, packing elements carried by the casing and shaft, a pair of supporting members forming axial extensions of said flanges at one end of the casing, a second pair of members which project axially from the casing at the opposite end, pedestals for the shaft bearings each having recesses between the cap and base portions to receive the outer ends of said members, sleeves which pass through the parts of the pedestals and the members and act as dowel pins, and retaining bolts which pass through the sleeves and also assist in holding the caps in place.

8. In an elastic fluid turbine, the combination of a rotor and its shaft, a divided casing for the same, packing elements carried by the casing and shaft, a detachable head for the exhaust end of the casing, a pair of members which extend axially from the high pressure end of the casing, a pair of members which extend axially from said head, the members on both ends of the casing being in substantially the same radial distance from the shaft, said members being rigid in a vertical plane and capable of flexing slightly in a horizontal plane, supports for the members one of which is movable axially, and pivotal means for uniting the members to their respective supports.

9. In an elastic fluid turbine, the combination of a foundation, a pair of pedestals mounted thereon which carry the shaft bearings, a rotor and its shaft, a casing for the rotor and shaft, packing elements carried by the shaft and casing, and a pair of members arranged at each end of the casing, one end of each member being connected to the casing and the other end being supported by a pedestal, said members being arranged to sustain the weight of the casing to prevent it from turning and also to move in the plane of the shaft as the diameter of the casing varies due to temperature changes.

10. In an elastic fluid turbine, the combination of a foundation, a pair of pedestals mounted thereon which carry the shaft bearings, a rotor and its shaft, a casing for the rotor and shaft, packing elements carried by the shaft and casing, a pair of members arranged at each end of the casing which project therefrom and are supported at their outer ends by the pedestals, said members being rigid in a vertical plane but yielding in a direction perpendicular to the shaft to compensate for radial expansions of the casing, and a steam inlet which is connected to the casing in a vertical plane which passes through the axis thereof.

In witness whereof, I have hereunto set my hand this 7th day of December, 1923.

OSCAR JUNGGREN.